United States Patent
Hogue et al.

(10) Patent No.: US 10,351,188 B2
(45) Date of Patent: Jul. 16, 2019

(54) DEVICES AND METHODS FOR INCREASING TRACTION OF CONTINUOUS TRACK VEHICLES

(71) Applicant: BAE Systems Land & Armaments L.P., Arlington, VA (US)

(72) Inventors: Joseph E. Hogue, Manchester, PA (US); Glenn E. Evans, York, PA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 0 days.

(21) Appl. No.: 15/359,981

(22) Filed: Nov. 23, 2016

(65) Prior Publication Data

US 2018/0141598 A1    May 24, 2018

(51) Int. Cl.
| | |
|---|---|
| *B62D 55/28* | (2006.01) |
| *B62D 55/32* | (2006.01) |
| *B62D 55/06* | (2006.01) |

(52) U.S. Cl.
CPC .............. *B62D 55/28* (2013.01); *B62D 55/32* (2013.01); *B62D 55/06* (2013.01)

(58) Field of Classification Search
CPC ................................. B62D 55/28; B62D 55/32
USPC .................................................. 305/187, 204
See application file for complete search history.

(56) References Cited

U.S. PATENT DOCUMENTS

| | | | | |
|---|---|---|---|---|
| 2,230,935 | A | * | 2/1941 | Lucien .................. B62D 55/28 305/117 |
| 2,301,954 | A | * | 11/1942 | Knox .................. B62D 55/211 305/164 |
| 2,339,273 | A | * | 1/1944 | Knox .................. B62D 55/205 305/113 |
| 2,390,542 | A | * | 12/1945 | Knox .................. B62D 55/211 305/197 |
| 2,731,304 | A | * | 1/1956 | Kubaugh ............. B62D 55/211 305/197 |
| 3,666,327 | A | | 3/1972 | Padilla |
| 4,093,319 | A | * | 6/1978 | Borner .................. B62D 55/27 305/189 |
| 4,262,972 | A | * | 4/1981 | Falk ..................... B62D 55/211 305/163 |
| 4,359,248 | A | | 11/1982 | Kortering |
| 4,586,757 | A | | 5/1986 | Bloechlinger |
| 4,626,046 | A | | 12/1986 | Collins, Jr. |
| 4,765,694 | A | * | 8/1988 | Cory .................... B62D 55/211 305/164 |
| 5,482,365 | A | | 1/1996 | Peterson et al. |
| 5,769,511 | A | | 6/1998 | Hattori |
| 6,076,901 | A | | 6/2000 | Rankin et al. |
| 6,540,310 | B1 | | 4/2003 | Cartwright |
| 8,562,081 | B2 | | 10/2013 | Sturmon |

(Continued)

FOREIGN PATENT DOCUMENTS

GB    2225991 A  *  6/1990  .......... B62D 55/211

*Primary Examiner* — Kip T Kotter
(74) *Attorney, Agent, or Firm* — Patterson Thuente Pedersen, P.A.

(57) ABSTRACT

The present invention is a continuous track center guide traction cap that is mountable to a conventional center guide for a continuous track assembly. The cap includes traction engagement features to increase traction. The features may include one or more grousers or other protrusions that provide better performance. The invention also includes the method of installing the traction cap to an existing center guide.

10 Claims, 7 Drawing Sheets

(56) References Cited

U.S. PATENT DOCUMENTS

| | | | |
|---|---|---|---|
| 2008/0136254 A1* | 6/2008 | Jacobsen | B62D 55/27 |
| | | | 305/165 |
| 2010/0146925 A1* | 6/2010 | Johannsen | B62D 55/213 |
| | | | 59/85 |
| 2011/0221266 A1* | 9/2011 | Bonnetain | B62D 55/202 |
| | | | 305/202 |
| 2012/0086265 A1* | 4/2012 | Simula | B62D 55/202 |
| | | | 305/106 |
| 2013/0049452 A1 | 2/2013 | Burling | |

* cited by examiner

DEVICES AND METHODS FOR INCREASING TRACTION OF CONTINUOUS TRACK VEHICLES

TECHNICAL FIELD

The devices and methods herein pertain to increasing traction of continuous track vehicles, and in particular to increasing traction of military vehicles using continuous track components.

BACKGROUND

While continuous track vehicles can provide greater traction and versatility than wheeled vehicles, a common problem found in continuous track vehicles is that the track surface is susceptible to loss of traction on soft, slick surfaces, such as mud and snow. In these conditions the cavities of the track can fill with the loose mud or snow material, converting the track into a large, low-friction surface.

Conventional track assemblies for continuous track vehicles comprise a series of interlocking shoes having connecting links and center guides serving as connecting devices between each shoe unit. The primary purpose of the center guides is to engage and align the track with the drive and suspension system.

There are a number of alteration devices aimed at addressing various traction conditions. For example, a device for altering a continuous track vehicle to operate on paved roads without damaging the pavement surface is described in U.S. Pat. No. 5,769,511 to Hattori. Hattori describes a detachable elastic pad to protect a road surface from damage caused by a tracked vehicle. The pads described in Hattori would not, however, increase traction on soft, slick surfaces, such as mud and snow.

Other alteration devices, such as U.S. Pat. No. 6,540,310 to Cartwright, describes a flexible grouser structure that provides traction and shock absorption for continuous track vehicles. Cartwright describes a device that attaches to the track and deflects upon impact with the ground in order to soften the riding characteristics of tracked vehicles. In heavy duty continuous track vehicles, however, flexible grouser structures would deteriorate quickly due to loading that exceeds material strength capabilities.

U.S. Pat. App. 2013/0049452 to Burling describes a rigid traction bar device that extends across the track providing extra traction. Specifically, Burling describes a right angle bar that attaches to both sides of the track and extends across the width of the track. Because the Burling device fastens to the outside edges of the track with the bar lying across the track, it is susceptible to loosening, movement, and detaching from the track. This fastening method is especially concerning with heavy duty continuous track vehicles which require a high level of track integrity.

A permanent improvement to continuous track vehicles to address slick terrain are tracks specifically made for mud and snow having aggressive tread built into the track shoes. Unfortunately, these special tracks are expensive to make and require large investments in time and labor to in order to convert between the original track and the high-traction track.

Since continuous tracked vehicles are used in all terrains, there is a need in the industry for a cheap and efficient way to increase traction of heavy duty continuous track vehicles when used in mud, snow and ice covered terrains.

SUMMARY

Devices and methods herein are directed to a traction cap that can be easily installed on an existing track without having to remove the track.

Embodiments are directed to a center guide traction cap device comprising conventional cap engagement features found on conventional center guide cap designs and high traction features not found on a conventional center guide cap. Each traction cap is configured to have one or more traction spires, where the traction spires are configured to extend beyond adjacent surfaces of a track shoe when the traction cap is installed between track shoes. Each traction spire is configured to have gripping edges for increased traction purposes.

The present invention can be installed by a vehicle crew using on-board hand tools and without additional support. When the vehicle is in better terrain conditions the original cap can be reinstalled.

The present invention is a track shoe assembly for a tracked vehicle, the track shoe assembly including a ground contact side and a drive mechanism engagement side, the assembly comprising: a track shoe including channels for a set of parallel pins, the set of parallel pins extending through the track shoe; a pin cap mounted to the end of the parallel pins; and a center guide disposed about the parallel pins adjacent to the track shoe, wherein the center guide includes a center guide base and a traction cap, the center guide base connected to the traction cap by a fastener, said traction cap and center guide base forming a path for the pins, said center guide including a projection to engage the drive mechanism; wherein the traction cap extends beyond the plane of the adjacent track shoe so as to extend into the ground. In the alternative, the traction cap may be shorter if the track shoe is configured to define a cutaway around the cap so that the cap can perform cleat functions.

The track shoe assembly may comprise a traction cap configured to embody spikes, pegs, or rasps. The traction cap may include a distal face having traction grousers, or an arcuate shape so that a grouser is formed at least at one margin. The distal face may alternatively include a plurality of grousers in ridges or a saw tooth like pattern.

The traction cap may define a channel for installation access so as to remove or fasten the traction cap to the center guide base without having to remove the track.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
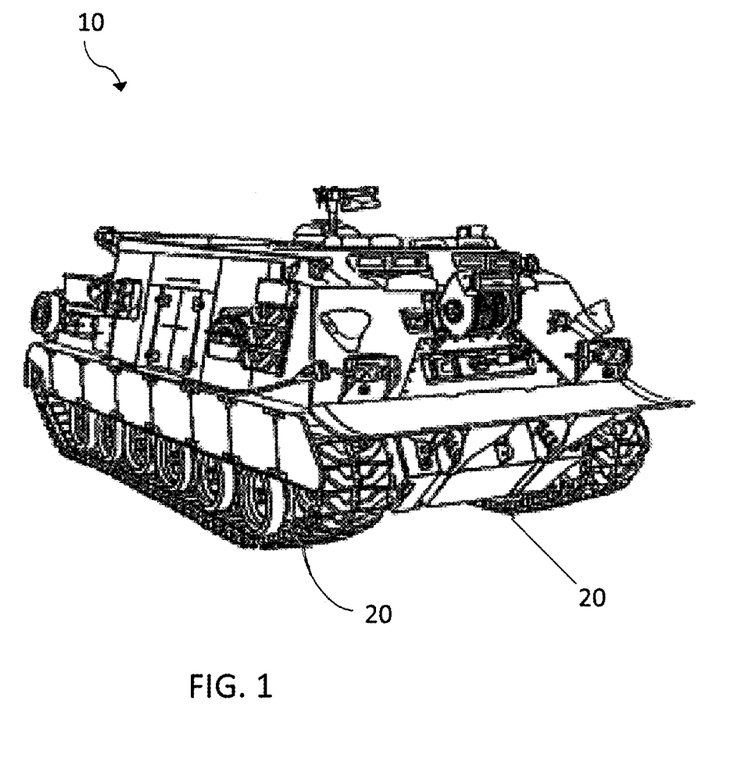
FIG. 1 is an isometric view of a heavy duty continuous track vehicle.

Heavy duty continuous track vehicle 10, such as the military vehicle shown in FIG. 1, are fitted with continuous tracks 20 that can be made of either a single, flexible track such as those seen on snowmobiles, or can comprise a plurality of individual rigid units that are coupled together, such as the continuous track 20 shown in FIG. 1. Heavy duty continuous track vehicles 10 generally require the latter type of track 20 because material strength of continuous flexible tracks is not enough to sustain the weight and operational requirements of heavy duty continuous track vehicles. As depicted in FIG. 1, there are typically two tracks 20 for each vehicle.

Figure 2:
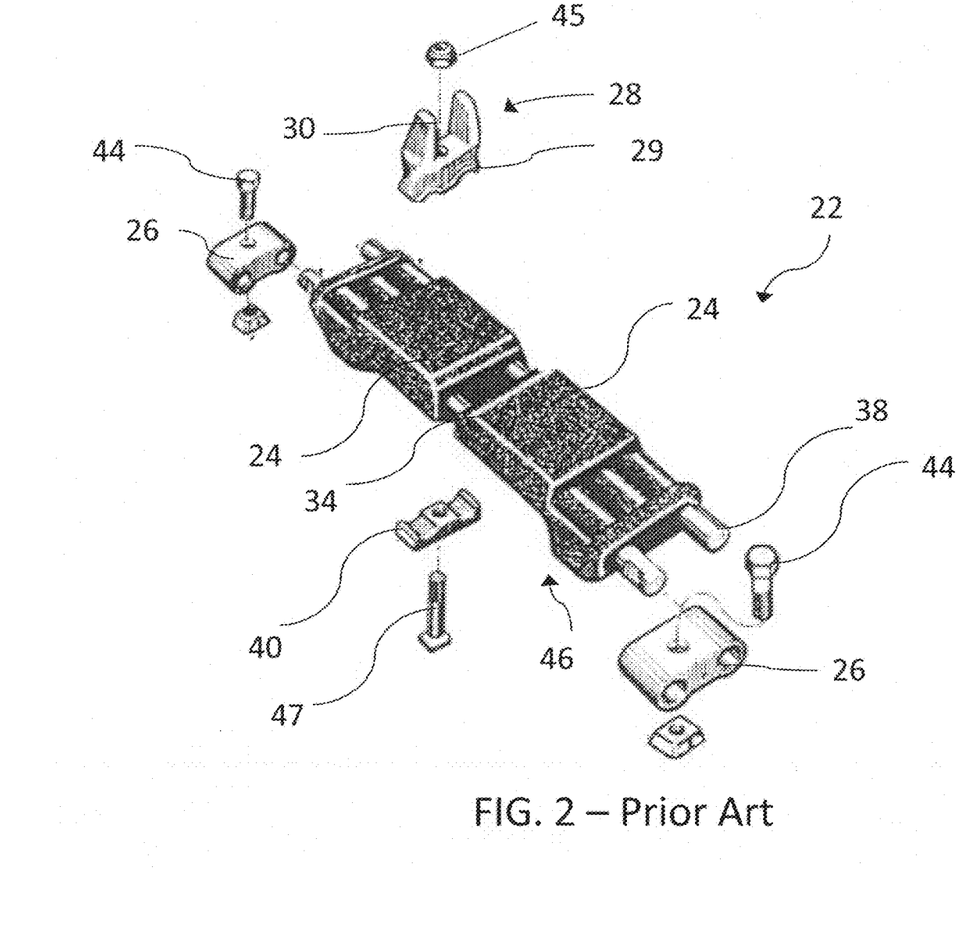
FIG. 2 is an exploded view of a prior art track shoe assembly.

Track 20 is comprised of a road engaging side 45 and a interior side 46 which engages the drive mechanism of the vehicle. The track 20 is comprised of a plurality of track shoe assemblies 22 which are pivotably connected to form one continuous track 20. Prior art track shoe assembly 22, as shown in FIG. 2, comprises a pair of track shoes 24, end connectors 26 and center guides 28. End connectors 26 serve to pivotally connect each track shoe assembly 22 to another adjacent track shoe assembly 22 to form the loop that is the continuous track 20. Track shoe assembly 22 further comprises a set of slidingly engaged pins 38 which extend in a parallel relationship through the track shoes 24. The distal and proximate ends of the pins 38 are attached, respectively, to the end connectors 26. The end connectors 26 are maintained in position on the track pins 38 by fasteners 44. A center guide space 34 is defined between the track shoes 24. A center guide 28 is positioned within center guide space 34. The center guides 28 serve to engage and align the continuous track 20 with the drive train and suspension system of heavy duty continuous track vehicle 10.

Figure 3:
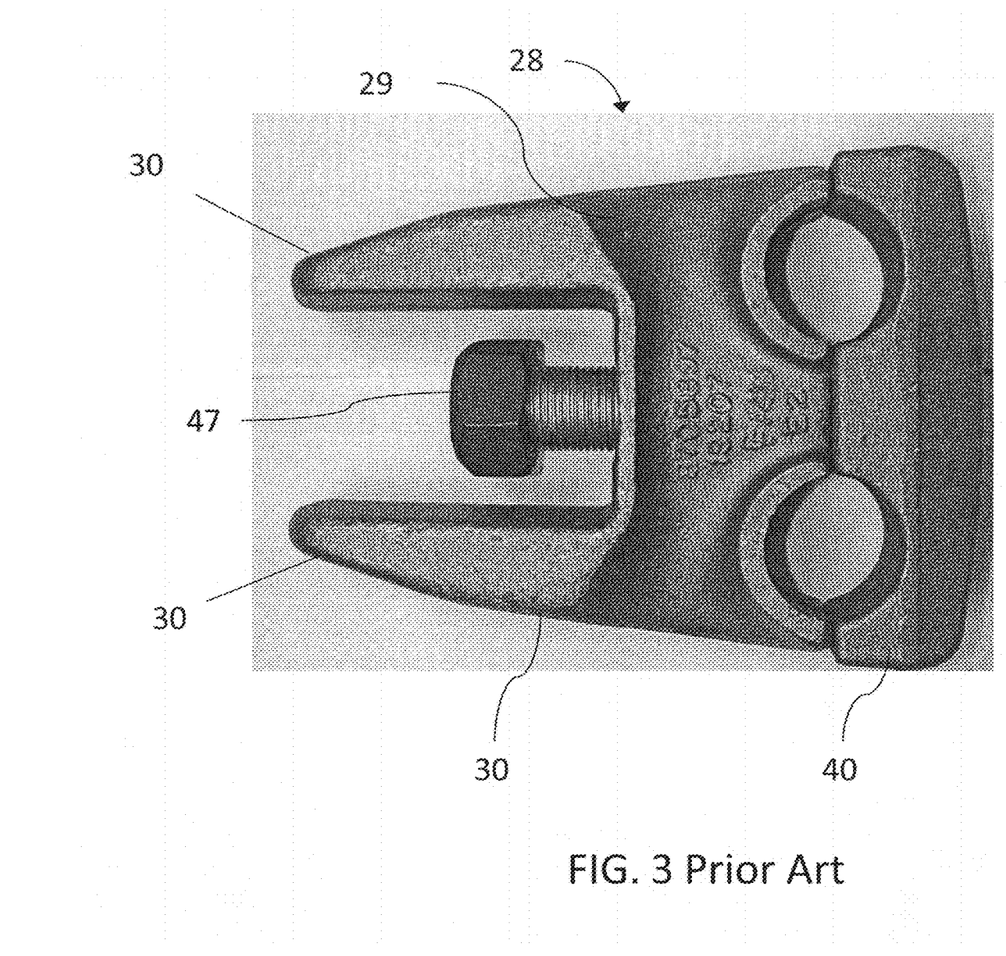
FIG. 3 is a front view of a prior art center guide assembly.

Conventional center guides 28 shown in FIG. 3 further comprise a center guide base 29 10 from which extend one or more projections 30, center guide cap 40 and one or more nuts 45 and bolts 47. The center guide base 29 is mated to the cap 40 and secured with the nut and bolt 47 such that a pin feature of two adjacent track shoe bodies 24 is pivotally captured between the center guide base 29 and cap 40.

Figure 4:
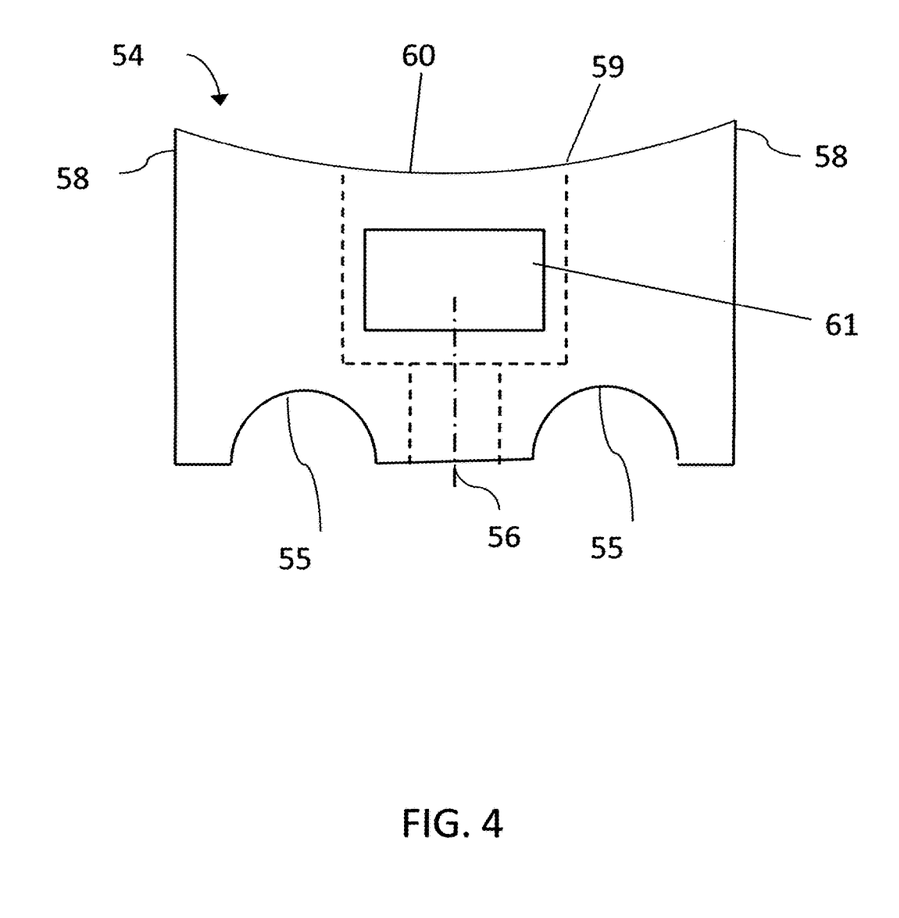
FIG. 4 is a front view of a traction cap.
Figure 5:
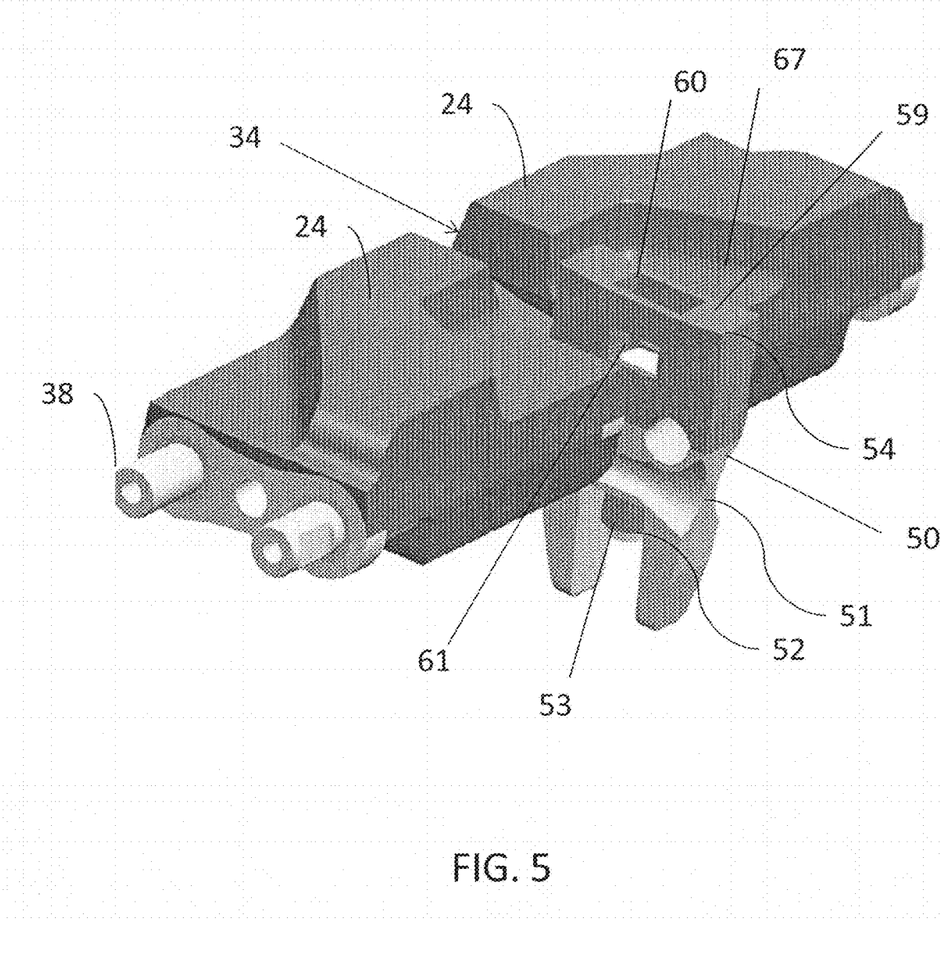
FIG. 5 is an isometric view of a traction cap installed on a center guide and track shoe.
Figure 6:
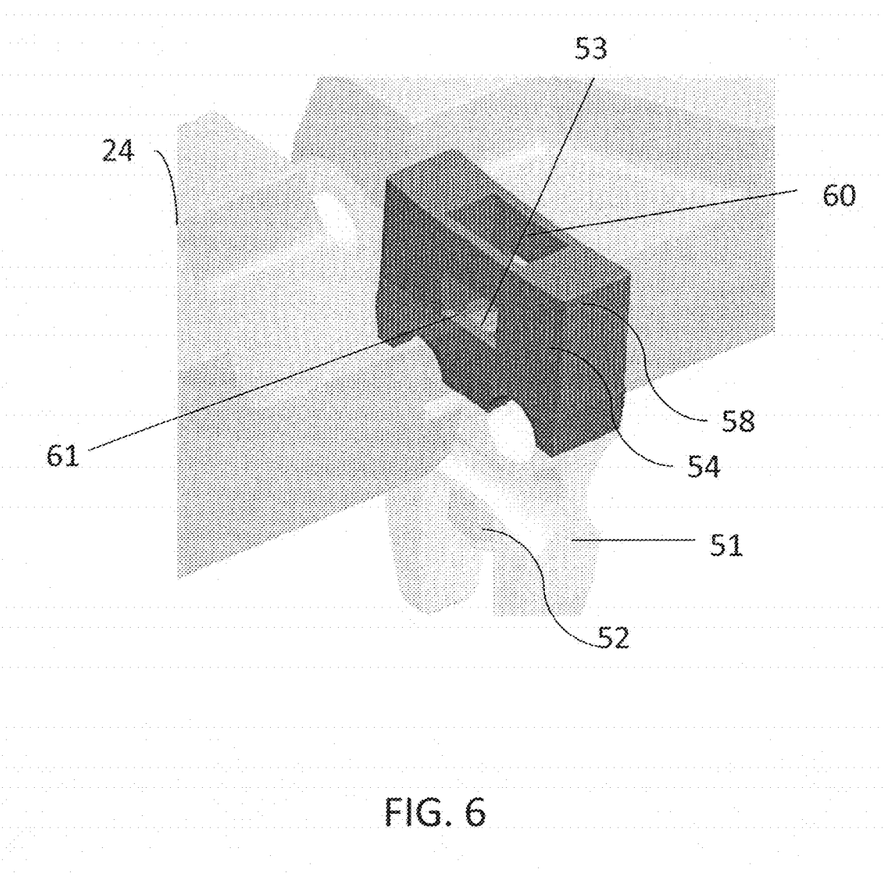
FIG. 6 is a semi-transparent isometric view of a traction cap installed on a center guide and track shoe.

As illustrated in FIGS. 4-6, in order to address the traction issues in muddy, snowy, and icy terrains, one embodiment of center guide 50 comprises center guide body 51, nut 52, bolt 53 and a traction cap 54. Traction cap 54 is configured to replace conventional cap 40 in the center guide 28 assembly. Traction cap 54 includes pin mating surface 55, bolt through hole 56, bolt access 57, and traction grousers 58. Note that in this embodiment center guide 50 spans across adjacent track shoe assemblies 22.

In embodiments as shown in FIGS. 5 and 6, traction grousers 58 extend beyond the adjacent surface of track shoe body 24 when installed in center guide space 34. In this embodiment, the traction cap 54 has an arcuate shaped distal face 59 to create the traction grouser 58 at opposing sides of the cap 54. The extension of traction grousers 58 beyond the cut away portion 67 of track shoe body 24 creates a high traction feature that provides additional gripping edges for use in low traction terrains. It is envisioned that the traction cap 54 could alternatively be a flat surface that extends beyond track shoes 24. Traction cap 54 may also define a cap opening 60 on the distal face 59. Cap opening 60, which forms a first channel with bolt through hole 56 , allows for access to the fastener and provides further edge surface for traction. Traction cap 54 may also define a cap second or center channel 61 that extends transversely through the body of the traction cap 54 to allow access to the fastener bolt 53.

Figure 7:
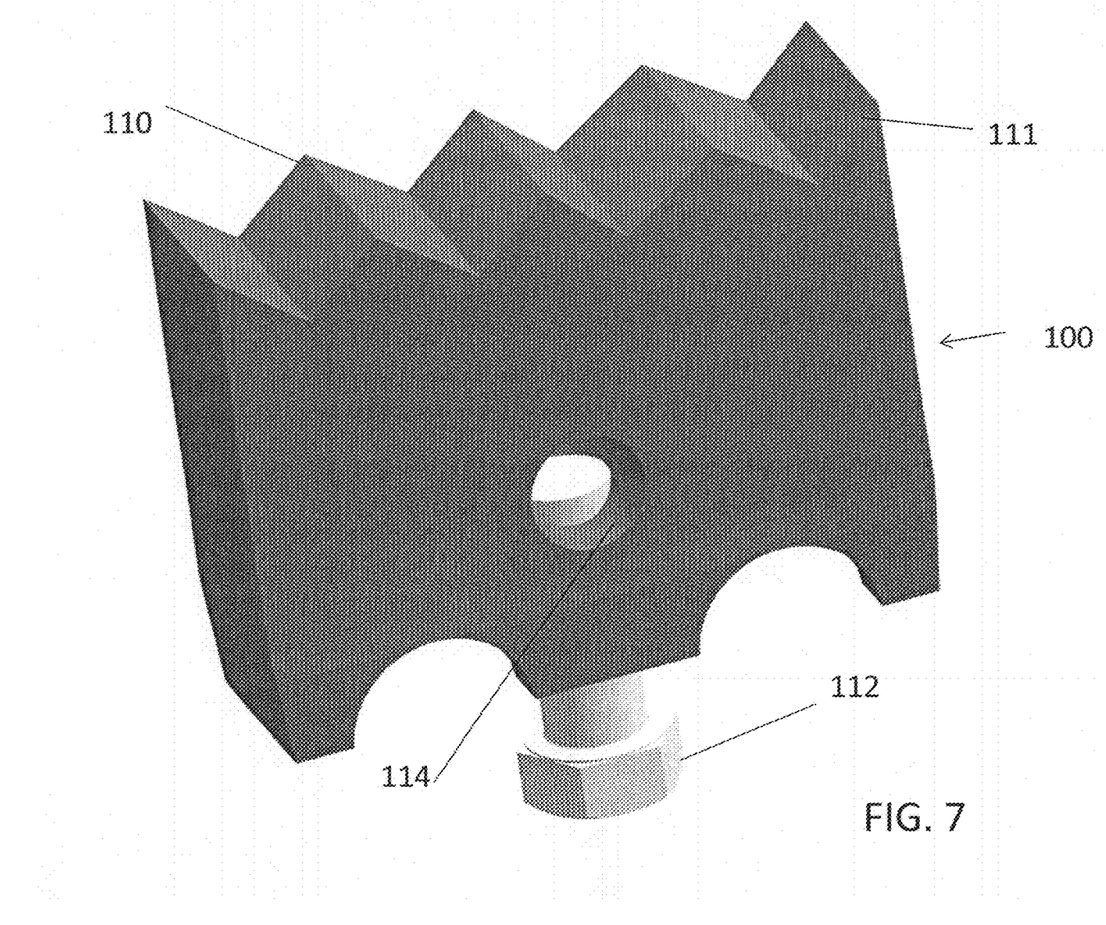
FIG. 7 is a front view of an alternate embodiment of a traction cap.

FIG. 7 depicts and alternate embodiment of traction cap 100. Traction cap 100 utilizes a plurality of spikes or grouser 110 as the surface that engages the ground. Spikes 110 are designed to provide a plurality of high traction features in order to increase traction. Further, traction cap 100 could also incorporate pegs, rasps, or other suitable high traction features on the traction surface 111 that engages the ground. As in the previous embodiment, it is envisioned that a center channel 114 would be disposed through the traction cap 100 to allow access to the fastener 112.

If the continuous track vehicle 10 is to be used on a muddy, snowy, icy or other low traction terrain, a technician or other user rotatably disengages nut 45 and removes cap 40 and replaces it with traction cap 54 and reengages nut 45. The user repeats this process on every track shoe 20, or a varied arrangement, until all caps 40 of the continuous track 20 are replaced with traction caps 54. Continuous track vehicle 10 is then fitted with heightened traction abilities for use on soft or slippery surfaces.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claims with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A track shoe assembly for a tracked vehicle, the track shoe assembly including a ground contact side and a drive mechanism engagement side, the track shoe assembly comprising:
   a plurality of track shoes, each of the plurality of track shoes including channels for a set of parallel pins, the set of parallel pins extending through the plurality of track shoes;
   a pin cap mounted to an end of one of the parallel pins and an end of one of an adjacent sets of parallel pins so as to connect sets of parallel pins; and
   a center guide disposed about the parallel pins the center guide disposed between adjacent track shoes,
      wherein the center guide includes a center guide base and a traction cap, the center guide base connected to the traction cap by a fastener, said traction cap and center guide base forming a path for the pins, said center guide including a projection to engage the drive mechanism;
   wherein the traction cap extends beyond a plane of the adjacent track shoe so as to extend into the ground and wherein the traction cap defines a first channel for insertion of a fastener so as to fasten the traction cap to the center guide base and a second channel, transverse to and intersecting the first channel for access to the fastener, said second channel is a through bore disposed entirely within the traction cap.

2. The track shoe assembly of claim 1, wherein the traction cap is configured to embody spikes.

3. The track shoe assembly of claim 1, wherein the traction cap includes a distal face having traction grousers.

4. The track shoe assembly of claim 3 wherein the distal face has an arcuate shape so that a grouser is formed on at least one margin.

5. The track shoe assembly of claim 3 wherein the distal face includes a plurality of grousers in a saw tooth like pattern.

6. The track shoe assembly of claim 1 wherein the track shoe has a cut away portion on the ground contact side so that the traction cap is exposed.

7. A method of improving the traction of a continuous tracked vehicle, the method comprising:
   removing a center guide cap from a center guide of a track shoe assembly, installing a traction cap on to a base of the center guide cap, said traction cap having a distal face with a traction feature, a first channel for insertion of a fastener so as to fasten the traction cap to a center guide base and a second channel, transverse to and intersecting the first channel for access to the fastener, said second channel is a through bore disposed entirely within the traction cap.

8. The method of improving the traction of a continuous tracked vehicle of claim 7 wherein the traction feature includes at least one grouser.

9. The method of improving the traction of a continuous tracked vehicle of claim 7 wherein the traction cap includes the distal face having an arcuate shape.

10. The method of improving the traction of a continuous tracked vehicle of claim 7 wherein the traction cap embodies spikes on the distal face.

* * * * *